United States Patent [19]
Johnston

[11] Patent Number: 5,143,150
[45] Date of Patent: Sep. 1, 1992

[54] GEOTHERMAL HEAT CONVERTER

[76] Inventor: James M. Johnston, 2002 W. Washington, Jackson, Mich. 49203

[21] Appl. No.: 833,167

[22] Filed: Feb. 10, 1992

[51] Int. Cl.$^5$ .......................... F28D 15/02; F24J 3/08
[52] U.S. Cl. .................. 165/45; 165/104.14; 165/133; 60/641.2
[58] Field of Search ............... 60/641.2; 165/104.14, 165/45, 104.21, 133

[56] References Cited

U.S. PATENT DOCUMENTS

| | | | |
|---|---|---|---|
| 3,572,426 | 3/1971 | Edwards | 165/104.14 |
| 3,782,468 | 1/1974 | Kuwada | 166/267 |
| 3,862,545 | 1/1975 | Ellis et al. | 60/641 |
| 3,911,683 | 10/1975 | Wolf | 165/45 |
| 4,057,964 | 11/1977 | Hutchinson | 60/165 |
| 4,272,961 | 6/1981 | Sadhukhan | 60/165 |

FOREIGN PATENT DOCUMENTS 79942  4/1986  Japan ................................. 60/641.2

Primary Examiner—Albert W. Davis, Jr.
Attorney, Agent, or Firm—Beaman & Beaman

[57] ABSTRACT

A geothermal heat converter for converting geothermal heat to steam. The converter is mounted in the lower end of a geothermal well conduit and includes a cup portion in direct engagement with the geothermal brine or medium. The cup portion is sealed with respect to the conduit, and the upper region of the converter includes a tubular housing constituting a heat exchanger having longitudinally extending tubes extending therethrough in communication with the cup. The cup is formed of a tungsten carbon composition, and is coated with platinum to reduce corrosion.

7 Claims, 1 Drawing Sheet

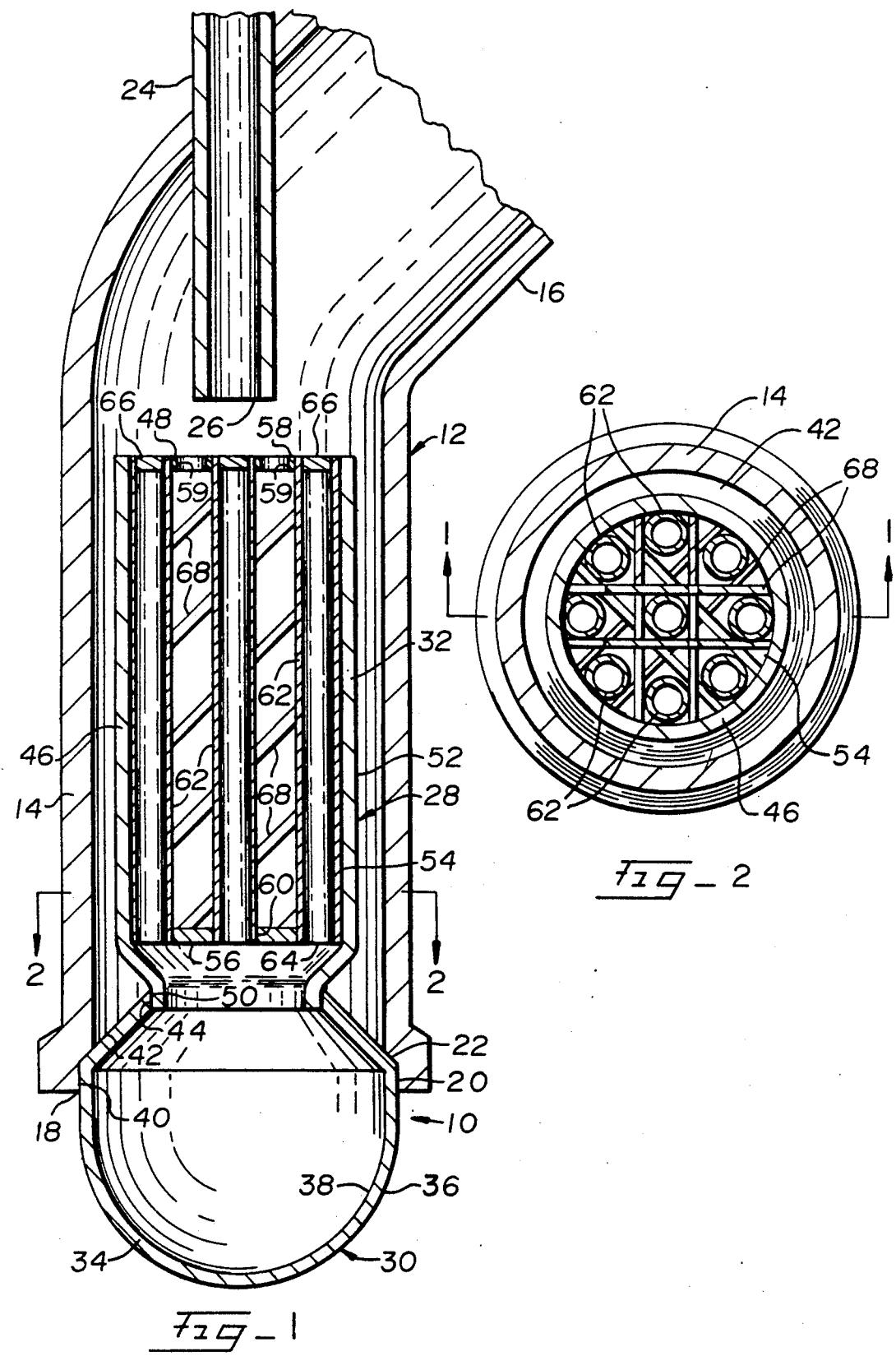

GEOTHERMAL HEAT CONVERTER

BACKGROUND OF THE INVENTION

1. Field of the Invention

The invention pertains to heat converters used with geothermal wells wherein the heat converter includes portions in direct contact with the hot underground medium, such as brine, and a heat exchanger portion associated with the converter converts water deposited upon the converter to steam.

2. Description of Related Art

In the desire to convert geothermal energy to steam or hot water so as to utilize such energy for practical purposes, such as the generation of electricity, geothermal wells are drilled in those regions wherein high temperature brine, water, steam, or molten rock may be available. Attempts to directly utilize geothermal steam in turbines for electric generation purposes have largely been unacceptable due to contaminants within the steam corroding the electrical generation apparatus. Accordingly, it has become more practical to convert the geothermal heat to a closed loop steam circuit wherein the steam may be maintained free of contaminants, such as shown in U.S. Pat. Nos. 3,862,545; 4,057,964; and 4,272,961.

However, existing energy conversion systems for converting geothermal heat to usable steam have high maintenance costs due to the corrosion of the heat converter used in the system which is in direct engagement with the hot subterranean medium. Geothermal brine, for instance, usually contains a number of chemicals and compositions highly corrosive to conventional heat converter materials.

SUMMARY OF THE INVENTION

It is an object of the invention to provide a geothermal heat converter for converting geothermal heat to usable steam wherein the converter has an extended life cycle and is capable of effectively resisting a highly corrosive geothermal medium.

Another object of the invention is to provide a geothermal heat converter which is of a simplified construction, and effectively provides sufficient surface area to rapidly convert geothermal heat to usable steam.

Yet an additional object of the invention is to provide a geothermal heat converter having a portion directly exposed to the hot subterranean medium, such exposed portion being highly resistant to corrosion, and a heat exchanger in direct heat exchanging relationship to the exposed converter portion and the heat transfer medium within the converter is capable of transferring the geothermal heat to steam in a closed circuit to provide a clean steam capable of generating electricity without deleterious effect on the generating apparatus.

In the practice of the invention, the geothermal heat converter is adapted to be inserted in the lower end of a geothermal well conduit or pipe. The converter includes lower and upper regions, and the lower region is in the form of a cup sealed to the well conduit which is directly exposed to the hot geothermal medium. The upper region of the heat converter is in the form of a heat exchanger located within and protected by the well conduit.

The heat exchanger portion of the converter is in the form of a tubular housing having a lower end in direct communication with the lower region cup. A pair of axially spaced head plates are located within the heat exchanger housing and a plurality of tubes are mounted within the head plates having a lower end in communication with the cup region and a closed upper end. The upper head plate includes openings between the tubes communicating with the interior of the well conduit.

The converter upper housing portion is directly mounted upon the cup portion and the cup portion and tubes contain a heat transfer medium such as liquid sodium or water. Many of the tubes within the housing are in direct engagement with the inner surface of the housing, and as water enters the housing through the upper head plate openings from a water supply pipe communicating with the interior of the well conduit such water is quickly converted to steam, and is transferred through the conduit to the electrical generation system.

In order to resist the highly corrosive geothermal medium, the cup is formed of a combination of tungsten (wolfram) and carbon, and the cup is externally coated or plated with a thin platinum layer to resist corrosion. The platinum layer may be located both externally and internally upon the cup configuration, and the combination of the platinum and tungsten-carbon cup material produces a cup having a long life even though exposed to very hot geothermal brine.

The cup includes sealing surfaces which seal the cup to the lower end of the well conduit, and the cup sealing surfaces prevent the geothermal medium from entering the well conduit.

BRIEF DESCRIPTION OF THE DRAWINGS

The aforementioned objects and advantages of the invention will be appreciated from the following description and accompanying drawings wherein:

FIG. 1 is an elevational, detail, diametrically sectioned view of a geothermal heat converter in accord with the invention as assembled to a well conduit as taken along Section 1—1 of FIG. 2, and FIG. 2 is a plan, sectional view of the converter as taken along Section 2—2 of FIG. 1.

DESCRIPTION OF THE PREFERRED EMBODIMENT

With reference to FIG. 1, the geothermal heat converter in accord with the invention is generally indicated at 10, and as illustrated, the converter 10 is located within a heat resistant geothermal well conduit 12. The conduit 12 includes a vertically oriented lower portion 14, and the conduit portion 16 is obliquely related to the portion 14 for a purpose later apparent. The conduit 12 includes a lower end 18, and the end 18 includes a cylindrical sealing surface 20 and a conical sealing surface 22 for cooperation with the heat converter sealing surfaces as later described.

A water pipe 24 intersects the oblique conduit portion 16 having a lower end 26 coaxially related to the conduit portion 14, and the water pipe 24 is connected to a source of clean water, not shown. The oblique orientation of conduit portion 16 permits the straight pipe 24 to be coaxial to the portion 14.

The heat converter 10 includes a hollow body generally indicated at 28, the body consisting of the lower region defining the cup 30, and the upper region which is defined by the cylindrical housing 32. The cup 30 includes a bulbous convex portion 34 which extends from below the conduit 12 and is in direct engagement with the hot geothermal medium, not shown, surrounding the conduit 12 and the cup 30. The cup 30 includes an outer surface 36 and an inner surface 38. Preferably, the cup 30 is formed of a tungsten and carbon composition wherein tungsten comprises approximately 50% by weight of the cup, while carbon comprises the other 50% by weight. The cup outer surface 36 is coated with platinum, such as of a thickness of approximately .05 inches, and, preferably, the cup inner surface 38 also is coated or plated with a thin layer of platinum.

The cup 30 includes a cylindrical sealing surface 40 which intersects the cup conical sealing surface 42 which converges in the direction of the housing 32, and as will be appreciated from FIG. 1, the cup sealing surface 40 sealingly engages the seal surface 20 of the conduit 12, while the cup conical sealing surface 42 sealingly engages the conduit conical surface 22. In this manner, the cup 30 seals the lower end of the conduit 12 preventing entry of the geothermal medium into the conduit.

The cup 30 is also provided with an upper cylindrical opening 44 which receives the lower end of the housing 32 as later described. The housing 32 includes a cylindrical wall 46 of an outer diameter less than the inner diameter of the conduit portion 14, and the housing includes an upper end 48 located with the interior of the conduit 12.

The housing lower end 50 is of a reduced cylindrical dimension and is received within the cup opening 44 and is welded or brazed therein whereby the cup 30 and housing 32 constitute an integral unit. The housing 32 is formed of a heat resistant alloy, but does not necessarily have to be of a tungsten and carbon composition, but may be so constructed.

The housing 32 includes a cylindrical outer surface 52, and a cylindrical inner surface 54, and a lower head plate 56 and an upper head plate 58 are located within the housing 32 adjacent the lower and upper ends thereof, respectively.

The head plates 56 and 58 are of a flat configuration and transversely extend across the housing 32 perpendicular to the length of the housing and in engagement with the housing inner surface 54. The head plates each include a plurality of aligned cylindrical openings 60 for sealingly receiving longitudinally extending metal tubes 62. The tubes 62 each include a lower end 64 which communicates with the lower end of the housing 32 and the cup 30, and the tube upper ends extend through the head plate 58 and are closed by plugs 66 so as not to communicate with the interior of the conduit 12. Holes 59 are formed in the head plate 58 between the tubes 62 to permit communication between the interior of the housing 32 and the well conduit 12. Preferably, obliquely disposed elongated bracing elements 68 are welded to the tubes 62 intermediate the head plates 56 and 58 and impart a structural strength to the tubes intermediate the head plates.

As will be appreciated from FIG. 2, those tubes 62 adjacent the housing inner surface 54 engage the housing inner surface in a heat transfer relationship between the head plates 56 and 58 wherein heat within the tubes 62 will be transferred by conduction to the contiguous housing 32.

The cup 30 and tubes 62 contain a heat transfer medium such as liquid sodium or water. The heat transfer medium within the heat converter 10 is in a closed vessel and when heated will produce high pressures capable of being confined by the heat converter.

With the cup 32 assembled to the lower end of the conduit 12 as shown in FIG. 1, it will be appreciated that the cup 30 is directly exposed to the heat of the geothermal medium surrounding the cup and the conduit lower region 14. This geothermal medium may take the form of hot brine, or may be hot water, steam, or even a molten material.

Water is introduced into the conduit 12 by the water pipe 24 which discharges from the pipe end 26 directly upon the heat exchanger defined by the housing 32 and head plate 58. Water entering the head plate holes 59 will flow into the housing 32 between the tubes 62 and be converted to steam which will exit holes 59 and is then removed from the conduit 12 through portion 16 for use in the generation of electricity in that the steam will pass through the conventional turbine and generator sets, not shown, as well known to those skilled in the art.

The water discharged on the heat converter housing 32 from pipe 24 will also surround the housing 32 and be converted to steam and the housing surface 52 and the outer surfaces of the tubes 62 in contact with water within the housing 32 will provide an effective surface area to transfer heat from the heat transfer medium to the water emitting from pipe 24. Of course, the amount of water flowing from pipe 24 will be controlled to provide the maximum steam generation without flooding the heat converter and decreasing its efficiency.

As the water entering the conduit 12 through the pipe 24 will be clean, the steam formed by the converter 10 will be clean and free of corrosive elements so as not to have a deleterious effect upon the generating equipment. If desired, the housing 32 may be formed of a combination tungsten and carbon composition, and the housing and tubes 62 can be interiorly plated with platinum for corrosion resistant purposes. However, in accord with the inventive concept it is important that the cup 30 be formed of the tungsten and carbon composition, and exteriorly covered with platinum to provide the high degree of corrosion resistance necessary to permit the apparatus to have a long and practical working life.

It is appreciated that various modifications to the inventive concepts may be apparent to those skilled in the art without departing from the spirit and scope of the invention.

I claim:

1. A geothermal heat converter for use in a geothermal well having a vertically oriented heat resistant conduit having a lower open end comprising, in combination, a body having a lower hollow region defining a cup having outer and inner surfaces and an upper elongated hollow region defining a housing having upper and lower ends, said housing lower end being in communication with the interior of said lower region cup and being in a heat transfer relationship to said lower region cup, spaced lower and upper head plates within said housing transversely disposed to the length of said housing located adjacent said housing lower and upper ends, respectively, a plurality of tubes having lower and upper ends within said housing supported within said head plates and extending therethrough whereby said tubes, lower ends communicate with said cup, means sealing said tube's upper ends, openings defined in said upper head plate intermediate said tubes, a sealing surface defined upon said cup outer surface for engaging and sealing said cup to the conduit lower end, a liquid heat transfer medium within said cup and said tubes, said cup being formed of a tungsten carbon material and said cup outer surface being coated with platinum.

2. In a geothermal heat converter as in claim 1, bracing elements interconnecting said tubes intermediate said head plates.

3. In a geothermal heat converter as in claim 1, said cup inner surface being coated with platinum 4. In a geothermal heat converter as in claim 1, said sealing surface including a conical surface portion converging in the axial direction of said housing.

5. In a geothermal heat converter as in claim 1, said housing having an inner surface, a plurality of said tubes within said housing engaging said housing inner surface in heat transfer relationship thereto.

6. In a geothermal heat converter as in claim 1, said cup being formed of a material substantially 50% tungsten and 50% carbon by weight.

7. In a geothermal heat converter as in claim 1, said heat transfer medium comprising liquid sodium.

* * * * *